United States Patent [19]
Wright

[11] 4,214,713
[45] Jul. 29, 1980

[54] LAWN DEBRIS PULVERIZER

[76] Inventor: George H. Wright, 3901 Country Club Rd., Winston-Salem, N.C. 27104

[21] Appl. No.: 916,141

[22] Filed: Jun. 16, 1978

[51] Int. Cl.³ .............................................. B02C 13/10
[52] U.S. Cl. .................................. 241/57; 241/101.7; 241/261; 241/285 B; 241/188 R
[58] Field of Search .................... 56/502, 501; 241/47, 241/54–57, 101.7, 188 R, 186 R, 190, 261, 285 A, 285 B

[56] References Cited

U.S. PATENT DOCUMENTS

| | | | |
|---|---|---|---|
| 3,329,350 | 7/1967 | Wisgerhof et al. | 241/188 R X |
| 3,463,406 | 8/1969 | Musgrave | 241/188 R X |
| 3,726,488 | 4/1973 | Aasland et al. | 241/101.7 |
| 3,817,462 | 6/1974 | Hamlin | 241/188 R X |

*Primary Examiner*—Mark Rosenbaum

[57] ABSTRACT

A grinder for pulverizing leaves, twigs and garden debris in which a chamber receives such materials to be pulverized therein by a plurality of rotating blades mounted on a shaft which blades cooperate with a series of axially and circumferentially spaced anvils with the pulverized debris flowing through the chamber for distribution or collection.

5 Claims, 8 Drawing Figures

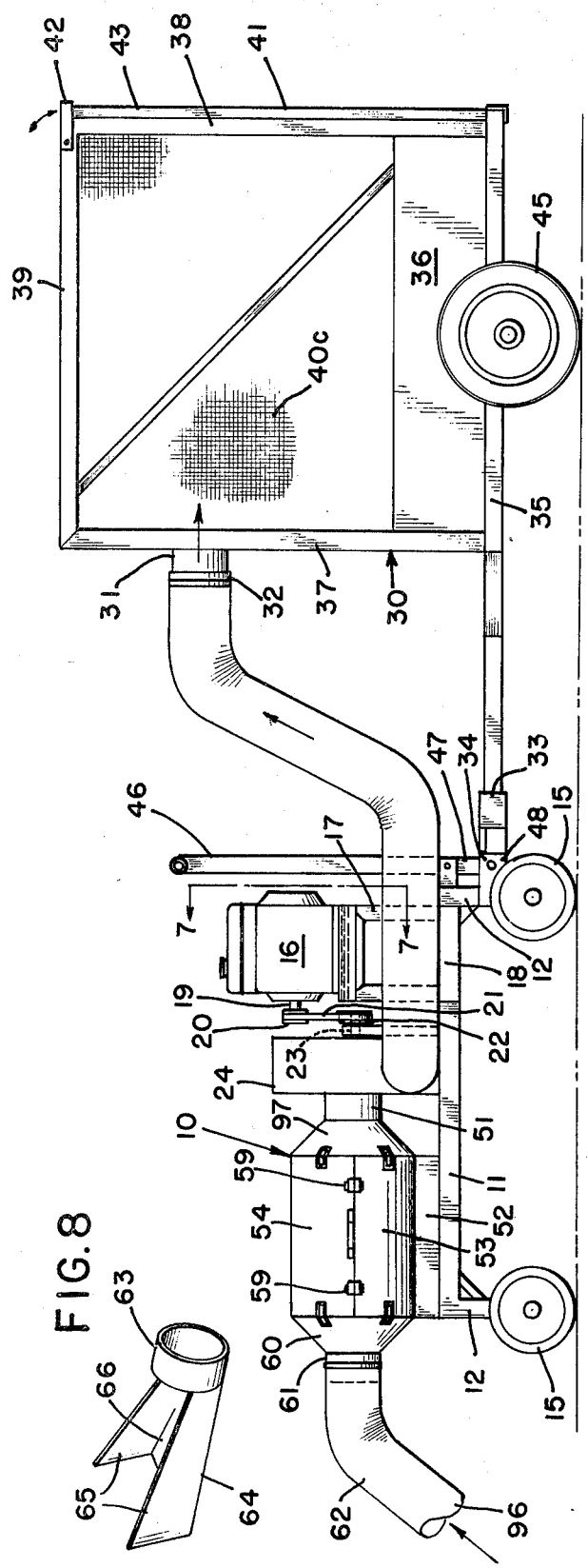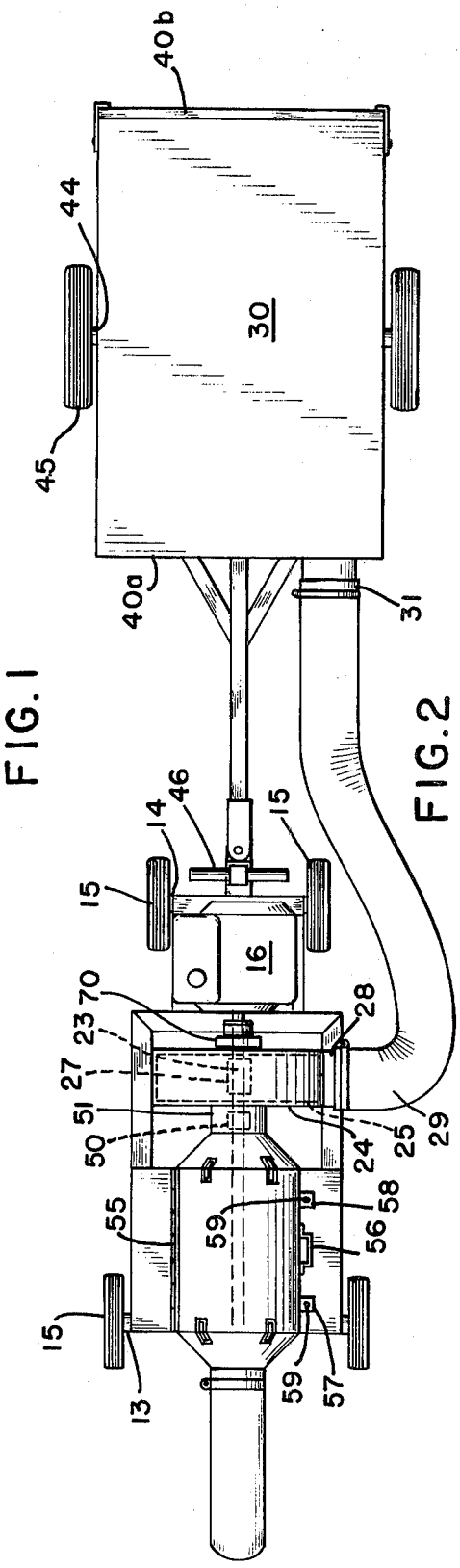

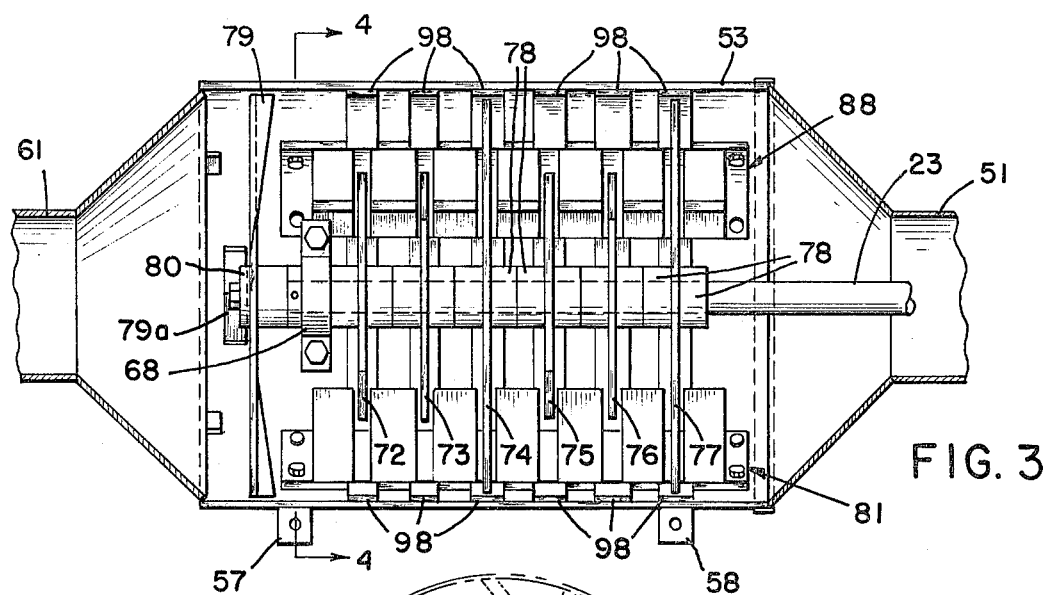
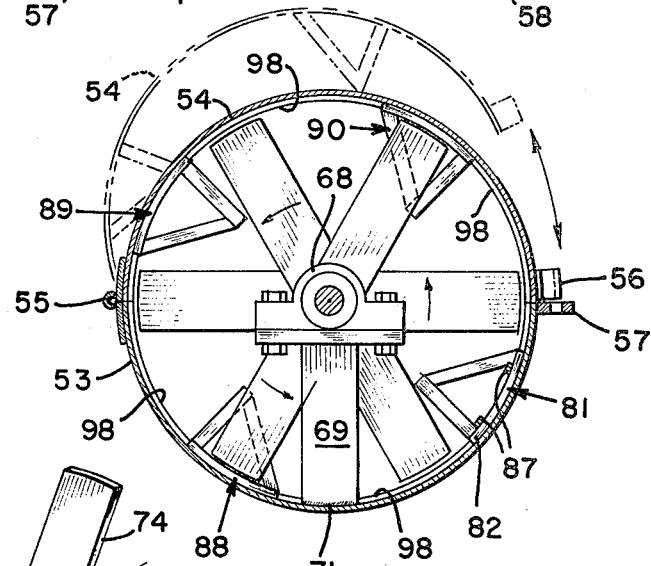
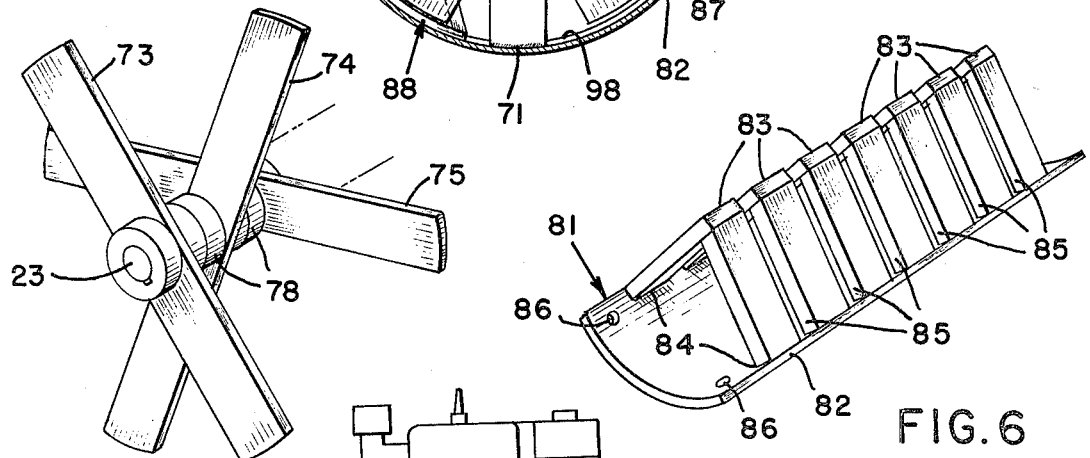
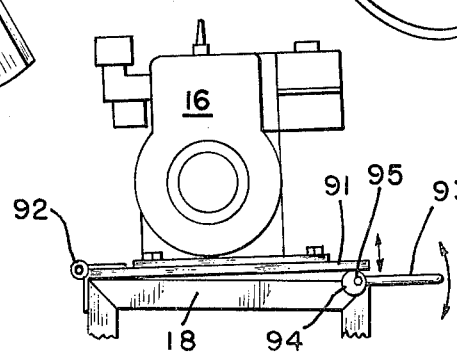

LAWN DEBRIS PULVERIZER

BACKGROUND, ADVANTAGES AND OBJECTIVES OF THE INVENTION

Each fall there are the annual leaf collection and disposal operations. Generally, in municipalities, the homeowner collects his leaves and lawn debris and deposits them at the street curb. From here, usually city employees, utilizing motor-driven vacuum leaf loaders, load the leaves and lawn debris into trucks and haul them away to private or public dumps. Being able to utilize this vast resource of organic material for soil enrichment would promulgate a major ecology advancement. Grinding or comminuting this collected mass of leaves and debris would make this advancement possible and practical.

Currently, commercial shredders and grinders such as those produced by The Roto-Hoe Company of Newbury, Ohio, and Amerind-MacKissic, Inc. of Parker Ford, Pennsylvania, are available for homeowner utilization. However, three major faults are inherent in most of these commercially available machines, namely: (1) manual introduction of the material to be ground; (2) resistance to grinding or comminuting of damp or wet material such as leaves; and (3) failure to grind to a particle size sufficiently small to permit the finally ground material to be mixed with the soil immediately after grinding.

Smaller pulverizing and lawn cleaning machinery are disclosed in U.S. Pat. Nos. 2,105,803; 2,590,734; 2,658,318; and 3,049,857 and some forms of these machines may have been utilized for leaf and debris pulverizing without achieving the desired performance and results of the present invention. Suction devices inducing the flow of lawn debris are disclosed in at least several of the aforementioned patents providing for the debris to be ground within a chamber before discharge.

It has been found advantageous to provide a grinder for leaves, twigs, and other lawn debris capable of being utilized by municipalities in larger models and for domestic use. Smaller models may be utilized for individual smaller home use permitting the redistribution of the pulverized leaves and finely comminuted debris for mixing into the soil and for use as mulch.

It is therefore an objective of this invention to provide a grinder or pulverizer for lawn and garden debris which will induce the flow of such debris into a chamber for pulverizing or comminuting and then discharging the comminuted or pulverized debris to either a collecting receptacle, bagging unit, or open pile.

Another objective of this invention is to provide a grinder for leaves, twigs and lawn and garden debris which will operate at high speed, grinding or comminuting the leaves or debris whether in a damp or wet condition as well as in a dry condition.

Another objective of this invention is to provide a grinder for leaves and lawn debris that will collect, comminute, and discharge the leaves and debris at a rate comparable to the collection rates of existing municipal leaf collection machines, and may be employed for use as a replacement for presently existing machines. It is anticipated that comminuted material utilizing the apparatus of this invention should increase truck load volume through increased density and render market value to collected leaves as an organic soil builder.

Another objective of this invention is to provide a grinder for leaves, twigs and lawn debris which is mobile and may be readily transportable from one location to another in which the grinder is provided with its own source of driving power preferably in the form of an internal combustion engine coupled to drive the pulverizing blades supported within a chamber while inducing a flow of air of sufficient volume and velocity to gather leaves, twigs and other garden or lawn debris through an appropriate connection to a chamber within which such materials may be ground and pulverized before discharge.

Other objectives and many of the attendant advantages of this invention will become more readily apparent to those having skill in the care of lawns and gardens and the collection of garden debris when considered in conjunction with the accompanying drawings and detailed description of a preferred embodiment taken in connection with the appended claims which are not intended to be limited to the specific embodiment described and mechanical equivalents are contemplated.

DESCRIPTION OF DRAWINGS

FIG. 1 is a side elevational view of a combined grinder for leaves, twigs and garden debris with a drive means and collection trailer mounted together;

FIG. 2 is a top plan view of FIG. 1;

FIG. 3 is a slightly enlarged and partial transverse sectional view of the grinder chamber interior with sections removed;

FIG. 4 is a partial transverse sectional view taken substantially along line 4—4 of FIG. 3 and illustrating, in outline form, a portion of the shell of a housing partially lifted;

FIG. 5 is a partial perspective view of a series of comminuting blades mounted on a shaft utilized within the chamber of FIGS. 3 and 4;

FIG. 6 is a perspective view of a sector including a series of anvils mounted in spaced relationship for an incorporation within the chamber of FIGS. 3 and 4;

FIG. 7 is a partial end elevational view taken substantially along the line 7—7 of FIG. 1; and FIG. 8 is a perspective view of a trough for mounting on the inlet end of the chamber for receiving larger twigs or branches.

DETAILED DESCRIPTION OF PREFERRED EMBODIMENT OF INVENTION

Referring to the drawings and particularly to FIGS. 1 and 2, there is illustrated a mobile lawn debris pulverizer apparatus 10 in which the supporting frame 11 constructed of suitable angle iron members is provided with vertically extending legs 12 to support an axle 13 and 14 on which tired wheels or casters 15 are mounted for rotation.

An internal combustion engine 16 is mounted on a supporting base 17 that is securely fixed to the extension 18 on the base frame 11 to supply rotation to the engine shaft 19 at the end of which there is a drive pulley 20 mounted. A flexible V-belt 21 engages and is driven by the pulley 20 with the belt 21 being in driving engagement with the pulley 22 that is secured to the projecting fan drive shaft 23.

A centrifugal fan housing 24 encases a centrifugal fan 25, shown only partially in schematic form, and with the fan blades being mounted on the shaft 23 through a suitable blade-supporting hub 27. The discharge opening 28 in the fan housing 24 is connected to a suitable flexible conduit 29 for directing the flow of pulverized materials therethrough into a mobile trailer unit 30. The mobile trailer unit 30 is provided with an inlet connection 31 for cooperatively receiving and having attached thereto the end 32 of the conduit 29 which may be retained by suitable releasable fastening means.

Trailer 30 is provided with a conventional releasable locking hitch 33 for connection to the cooperating hitch coupling 34 on the lower end of the frame 18. The trailer frame 35 is also preferably constructed from angle iron or pipe on which rear section a debris-containing receptacle is mounted having its lower portion formed of solid panels 36 with vertically-extending corner braces 37 and 38 and horizontal interconnecting top braces 39 at each side with interconnecting front and rear sections 40a and 40b to form the cubicle at the upper portion of which a perforated screen 40c is framed to permit the discharge of air while retaining the small pulverized particles within the trailer cubicle.

A removable rear gate 41 with an upper perforated screen is suitably supported at its bottom and secured at the sides with pivoted latches 42 which releasably engage the cooperating latch locking legs 43 mounted on the rear corner braces 38. The trailer frame 35 is provided with an axle 44 to support the tired wheels 45 that are rotatably mounted thereon to maintain the trailer at a suitable level above the ground.

A T-shaped handle 46 is pivotally mounted at one end 47 to a clevis joint 48 to facilitate movement of the lawn debris pulverizer without the use of the attached trailer unit 30.

The shaft 23 extends axially through the encircling fan housing inlet 51 and the fan housing 24.

The lawn debris pulverizer apparatus 10 is suitably cradled on the supporting base 52 that is secured to the frame 11 to maintain the cylindrical housing 53 in substantial alignment. The lower half cylindrical shell 53 is suitably secured to the base 52 while the upper half cylindrical shell 54 is pivotally connected by means of the elongated hinge 55 to the lower cylindrical housing 53 with the upper shell 54 being provided with a lifting handle 56 for raising and lowering the upper cylindrical shell 54 about the hinge 55 from the lower cylindrical shell 53. Projecting pairs of cooperating lugs 57 and 58 are welded or secured suitably to the lower and upper cylindrical shells 53 and 54 cooperatively to receive the locking bolts 59 through openings provided therein to maintain the upper shell securely fastened to the lower shell during grinding and pulverizing.

A diverging frusto-conical member 60, is provided with a projecting conduit-receiving sleeve member 61, mounted to the converging section of the member 60 to support the flexible conduit 62 into which leaves, twigs, acorns and other garden debris will be sucked by the induced draft generated by the centrifugal fan 25 during rotation as it is driven by the internal combustion engine 16 with the flow of intake air scooping all of the debris surrounding the inlet including wet leaves and debris. It is desirable to have the flexible conduit 62 sufficiently long to form a loop extending downwardly to avoid picking up heavy rocks and other debris which will be permitted to fall back down to the ground before entering the pulverizer chamber as a protective measure. The air will flow through the apparatus 10, the fan housing 24 and be discharged through the housing outlet 28 into the flexible conduit 29, ultimately to be discharged into the trailer unit 30 where the air will be filtered of discrete ground or comminuted particles which will be deposited within the trailer and the air will be permitted to flow through the reticulated wire mesh 40. When the trailer 30 is not utilized, the particles may be placed in a pile or into a receiving truck for hauling to a remote location.

When twigs, branches, stalks, acorns, bark, etc. are to be pulverized, it has been found desirable to remove the flexible hose 62 from the sleeve 61 and place thereover the tubular collar 63 of the supporting trough 64 whose side walls 65 diverge outwardly and whose bottom wall 66 will support the various materials placed thereon which may be fed manually and sucked into the air stream flowing into the inlet of member 60 of the apparatus 10.

There is illustrated in FIG. 3 the interior of the pulverizer apparatus 10 in which the shaft 23 is bearingly supported proximate one end by the bearing block assembly 68 that is mounted securely on the vertical leg 69, the lower end of which is securely fastened to the shell interior 71. The other end of shaft 23 is bearingly supported in a supported bearing block 70 adjacent to the fan housing 24. A series of axially spaced blades 72–77 with flat ground leading edges is mounted on the shaft 23 through suitable hub means 78 in which the blades are preferably provided with shear pins (not shown) permitting the blades to avoid fracture upon impact with certain objects such as stones and metal in order to preserve the integrity of each of the blades 72–77 whose leading ground edges may be hardened steel. It is contemplated that, in normal operations, the shaft 23 will rotate in excess of 2500 rpm or higher. It is further contemplated that one or more free-swinging hammers may be used in place of one or more of the blades.

A main inlet blade 79, preferably with sharpened leading edges, is securely mounted by the hub 80 at the end of shaft 23 and will serve the purpose of shearing elongated materials such as twigs, branches and stalks to form smaller fragments to be ground by the blades 72–77 and V-blocks or anvils 81, 88, 89 and 90. Oppositely placed entrance anvils 79a are mounted securely at the entrance end of shells 53 and 54, with only one entrance anvil 79a being illustrated in the lower cylindrical shell 53. An oppositely mounted entrance anvil 79a is mounted on the upper cylindrical shell 54. The entrance blade 79 not only severs or shears elongated materials but also serves to break up clumps of damp leaves and materials while preventing such materials from becoming lodged against the bearing block 68 and support 69.

There is illustrated in FIG. 5 a series of only three blades 73–75 mounted on the shaft 23 indicating one preferred form of displacement in the mounting of the blades to permit interrupted flow of the materials to produce increased grinding and pulverizing of the materials as they pass through the pulverizing apparatus.

A series of anvil segments 81 is mounted on the interior of the cylindrical shells 53 and 54 at circumferentially-spaced positions as illustrated in FIG. 4 with each of the segments 81 being provided with an arcuate sector 82 on which there is mounted a plurality of spaced-apart inverted fabricated V-shaped blocks 83 which are welded at their bases 84 to the sector 82 and forming between the plurality of blocks 83 blade-receiving slots 85 through which one of the series of blades 72–77 may pass freely. The individual sectors 81 are provided with openings 86 to be bolted by means of fastening members 87 to the interior of the cylindrical shells 53 and 54. The additional anvil sectors 88, 89 and 90 are substantially identical to the sector 81 and serve in the same function so that a further description of each is unnecessary.

It will be readily determined that two of the sectors 89 and 90 are mounted in the interior of the upper cylindrical shell sector 54 and the other two mounted on the interior of the lower cylindrical shell sector 53 as is more clearly shown in FIG. 4.

A series of arcuate spacers 98 is securely fastened to the interior of the upper and lower cylindrical shells 53 and 54 in spaced alignment with the travel of blades 72–77 and between the anvil sectors 81, 88, 89 and 90. The spacers 98 serve to reduce slippage of the materials being processed past the tips of the blades 72–77 and to interrupt the material flow between anvil sections 81, 88, 89 and 90.

There is illustrated in FIG. 7 one means for placing the shaft 23 in driving engagement with the driving shaft 19 and pulley 20 through the belt 21 by positioning the internal combustion engine 16 on a pivotable platform 91 that is hingedly connected through the hinge 92 to the platform 91 and to the frame 18. A lever 93 having an eccentric cam 94 mounted thereon is pivotally secured by the pin 95 to the frame 18 whereby upon clockwise rotation of the lever 93, the belt 21 will be sufficiently slack to prevent transmission of rotation of the pulley 20. Upon counterclockwise rotation of the lever 93, the platform 91 will be pivoted through the eccentric cam 94 thereby transmitting rotation of the pulley 20 to the belt 21 which will then engage and drive the driven pulley 22 and the connecting shaft 23 which will rotate the centrifugal fan 25, and blades 72–77 and 79.

With the internal combustion engine 16 operating, and the shaft 23 being rotated, air will be induced to flow through the flexible conduit 62, the pulverizer 10, the housing 24 and through the flexible conduit 29 into trailer cubicle 30. Refuse of all types commonly collected on a lawn will be sucked into the inlet end 96 of the flexible connector 62 which may be provided, if desirable, with an inlet nozzle of any desired configuration to pick up all types of debris. As previously stated, an elevated loop in this inlet connection 62 will exclude heavy rocks and other dense materials through gravity. As the materials are sucked into flexible conduit 62, the material will be dispersed outwardly radially through the diverging member 60, the entrance anvils 79a, and revolving blade 79 after which the materials will be acted upon progressively by the blades 72–77 which will drive the materials against the circumferentially spaced stationary anvils 81, 88, 89 and 90 for progressive pulverization or comminution into finer and finer particles before being discharged into the frusto-conical converging pulverizer outlet 97. It will be readily recognized that the materials flowing through the cylindrical shell sectors 53 and 54 will be acted upon repeatedly by the blades 72–77 and by the series of circumferentially-spaced and longitudinally-spaced anvils as the materials progress from the inlet to the discharge of the pulverizer apparatus 10 before being discharged into the fan housing 24 where they will discharge through the discharge connection 28 into the flexible connector 29 enroute to the trailer 30, on the ground, into a bag or any other suitable receptacle including a refuse collection vehicle.

Upon removal of the flexible conduit 62 and replacement by the trough 64, with the collar 63 mounted on the sleeve 61, longer twigs, branches and clumps of debris may be comminuted and pulverized including wet leaves which may also be sucked into the flexible conduit 62. It has been determined that wet leaves may be pulverized quite readily without clogging the apparatus. It has also been determined that the fineness of the comminuted or pulverized materials render them readily suitable for immediate mixing in the soil as an organic soil builder. However, it is preferable to spread the pulverized materials before they become wet and compressed for best results.

I claim:

1. A lawn debris pulverizer for comminuting leaves, twigs and garden residue comprising; a housing having a diverging frusto-conical inlet and a converging frusto-conical discharge openings at opposite end thereof for receiving leaves, twigs and garden residue therein, said housing having a central cylindrical member with lower and upper half-cylindrical shells cooperatively aligned and hingedly connected together for pivotally displacing the upper shell relative to said lower shell and an internal chamber and a shaft rotatably axially-supported therein, means for rotating said shaft, a debris dispersion means mounted on said shaft adjacent to said inlet in said internal chamber, a plurality of comminuting means mounted on said shaft in axial-spaced relation to said debris dispersion means and axially spaced from each other to rotate with said shaft, a series of shearing means flush mounted in said internal chamber and spaced from each other and including inverted V-shaped anvils, each of said series of shearing means having comminuting means receiving slots therebetween through which a shaft-mounted comminuting means passes to cooperate with the shearing means whereby leaves, twigs and garden residues will be comminuted progressively as they pass through said housing by the action of said comminuting means and shearing means, and means for generating a flow of air through said housing which flow of air will induce the leaves, twigs and garden residues into and through said housing for discharge therefrom.

2. A lawn debris pulverizer as claimed in claim 1, said shaft rotating means including an internal combustion engine, said means for generating a flow of air through said housing including a centrifugal blower, said blower being driven by said internal combustion engine.

3. A lawn debris pulverizer as claimed in claim 1, said comminuting means including a series of axially spaced blades, and said series of shearing means adjacent to blade travel to prevent material accumulation being mounted contiguous with said internal chamber, and each of said shearing means having openings therein for flow of debris therethrough.

4. A lawn debris pulverizer as claimed in claim 1, and a flexible conduit connected to the housing inlet opening to direct the flow of air and materials into said housing, and a flexible conduit connected to said air flow generating means to discharge air and comminuted materials to a remote location.

5. A lawn debris pulverizer as claimed in claim 4, means mounting said housing and air generating means having wheels thereon, and a wheeled trailer releasably coupled to said mounting means for receiving the discharged air and comminuted materials therein, said trailer being connected to said flexible conduit from said air flow generating means, said trailer having means for retaining the comminuted materials therein.

* * * * *